United States Patent
Hegner et al.

(10) Patent No.: US 6,516,670 B2
(45) Date of Patent: Feb. 11, 2003

(54) PRESSURE SENSOR

(75) Inventors: Frank Hegner, Lörrach (DE); Karl Flögel, Schopfheim (DE); Karlheinz Banholzer, Hausen (DE); Bernd Rosskopf, Hausen (DE)

(73) Assignee: Endress + Hauser GmbH + Co., Maulburg (DE)

(*) Notice: Subject to any disclaimer, the term of this patent is extended or adjusted under 35 U.S.C. 154(b) by 0 days.

(21) Appl. No.: 09/928,506

(22) Filed: Aug. 14, 2001

(65) Prior Publication Data

US 2002/0040604 A1 Apr. 11, 2002

(30) Foreign Application Priority Data

Oct. 10, 2000 (DE) .......................................... 100 49 996

(51) Int. Cl.[7] ................................................. G01L 7/08
(52) U.S. Cl. ........................................................ 73/715
(58) Field of Search .......................... 73/715, 706, 756, 73/723, 702, 718; 128/675; 137/551

(56) References Cited

U.S. PATENT DOCUMENTS

| | | | |
|---|---|---|---|
| 5,461,922 A | * 10/1995 | Koen | 73/756 |
| 5,535,777 A | * 7/1996 | Maracchi | 127/458 |
| 5,892,156 A | * 4/1999 | Kathan et al. | 73/706 |

* cited by examiner

Primary Examiner—Hezron Williams
Assistant Examiner—Marissa Ferguson
(74) Attorney, Agent, or Firm—Jones, Tullar & Cooper, P.C.

(57) ABSTRACT

A pressure sensor is provided having a housing, a process connection which is connected to the housing and serves to feed a medium whose pressure (p) is to be measured to a membrane which his arranged in the housing, said membrane, in operation, undergoing a deflection which depends on the pressure (p) which is to be measured, which pressure sensor can have a seal made of a chemically highly resistant material and in which the membrane can consist either of ceramic or metal, which pressure sensor has a seal which seals a gap found between the housing and the process connection and/or the membrane, bears directly against the gap and covers the gap, and which is clamped between the housing and the membrane, and which pressure sensor has a spring which is two-legged in cross section, whose first and second legs enclose an acute angle, whose first leg has a leg surface which faces away from the second leg, rests on a supporting surface and is connected fixedly to the latter, and whose second leg has a leg surface which faces away from the first leg, bears in a planar manner against the seal and exerts a spring force on the seal, which spring force acts in the direction of the gap.

7 Claims, 2 Drawing Sheets

PRESSURE SENSOR

TECHNICAL FIELD

The invention relates to a pressure sensor having a housing, a process connection which is connected to the housing and serves to feed a medium whose pressure is to be measured to a membrane which is arranged in the housing, said membrane, in operation, undergoing a deflection which depends on the pressure which is to be measured, and a seal which seals a gap found between the housing and the process connection and/or the membrane.

BACKGROUND OF THE INVENTION

Pressure measurement uses, for example, arrangements measuring the absolute pressure, relative pressure and differential pressure. In the case of arrangements measuring the absolute pressure, the pressure which is to be measured is sensed in absolute form, i.e. as a difference in pressure with respect to a vacuum. With an arrangement measuring the relative pressure, a pressure which is to be measured is recorded in the form of a difference in pressure with respect to a reference pressure, for example a pressure prevailing at the location of the sensor. In most applications, this is the atmospheric pressure at the location of use. Therefore, in the case of arrangements measuring the absolute pressure, a pressure which is to be measured is sensed with reference to a fixed reference pressure, the vacuum pressure, and in the case of arrangements measuring the relative pressure, a pressure which is to be measured is sensed with reference to a variable reference pressure, for example the ambient pressure. An arrangement measuring the differential pressure senses a difference between a first pressure and a second pressure fed to a differential-pressure measuring cell.

These arrangements for measuring pressure can all be realized using pressure sensors of the type mentioned at the beginning.

In order to be able to cover the greatest possible spectrum of possible uses, for example in chemistry and in the processing industry, seals having a high chemical resistance are required. Examples of suitable seal materials are polyfluorocarbons, for example polytetrafluoroethylene (PTFE). However, most chemically highly resistant sealing materials are free-flowing and change their shape when exposed to great changes in pressure and/or temperature. In pressure measurement, there is the risk that seals made of these materials become deformed and leaky over time. This may be very hazardous depending on the use because, for example, very hot media which are under high pressure and are chemically very aggressive may escape through the gap between the housing and the process connection and/or the membrane.

U.S. Pat. No. 4,798,089 describes a pressure sensor having
  a housing,
  a process connection which is connected to the housing and serves to feed a medium whose pressure is to be measured to a membrane which is arranged in the housing,
    the membrane, in operation, undergoing a deflection which depends on the pressure which is to be measured, and
  a seal
    which fills a gap found between the housing and the process connection,
    bears directly against the gap and covers the gap, and is clamped between the housing and an outer, pressure-insensitive edge of the membrane.

The membrane is a metallic separating membrane of a pressure-transmitting means which is filled with a liquid which transmits a pressure acting on the separating membrane to a pressure-measuring cell. In order for it to be possible to use a seal which is made of a material which is free-flowing because of pressure and/or temperature, a metallic surround is provided which has a first annular surface bearing against the seal, is connected fixedly to the membrane by a weld and has a second annular surface which bears against the seal and exerts a spring force on the seal, which spring force acts in the direction of the gap.

Pressure measurement advantageously makes use of ceramic pressure-measuring cells, since ceramic pressure-measuring cells have a measuring accuracy which is stable over a very long time. One reason for this is the fixed ionic bonding of ceramic resulting in the material being very durable and hardly aging at all in comparison with other materials, for example metals.

Ceramic pressure-measuring cells have hitherto conventionally been clamped at an outer edge into a housing with a seal being connected in between. A pressure which is to be measured is fed to the membrane through an opening in the housing or a process connection connected to the housing, which is generally metallic. A pressure which is to be measured can be fed directly to measuring cells of this type. The use, for example of a pressure-transmitting means connected upstream is not conventionally provided in the case of these pressure-measuring cells.

Ceramic has a very high chemical resistance and it would therefore be of great advantage to be able to use the abovementioned, chemically highly resistant sealing materials also in the case of pressure sensors having ceramic pressure-measuring cells. However, a surround as is known from the abovementioned prior art cannot be used in conjunction with ceramic pressure-measuring cells, since the surround cannot be welded onto a membrane made of ceramic.

SUMMARY OF THE INVENTION

An object of the invention is to provide a pressure sensor having a housing, a process connection which is connected to the housing, and a seal which seals a gap found between the housing and the process connection and/or the membrane, which pressure sensor can have a seal made of chemically highly resistant material and in which the membrane can consist either of ceramic or of metal.

To this end, the invention involves a pressure sensor having
  a housing,
  a process connection which is connected to the housing and serves to feed a medium whose pressure is to be measured to a membrane which is arranged in the housing,
    the membrane, in operation, undergoing a deflection which depends on the pressure which is to be measured,
  a seal
    which seals a gap found between the housing and the process connection and/or the membrane,
    which bears directly against the gap and covers the gap, and
    which is clamped between the housing and the membrane, and a spring which is two-legged in cross section
whose first and second legs enclose an acute angle,
whose first leg has a leg surface which faces away from the second leg, rests on a supporting surface and is connected fixedly to the latter, and
whose second leg has a leg surface which faces away from the first leg, bears in a planar manner against the seal and exerts a spring force on the seat which spring force acts in the direction of the gap.

According to one refinement, the seal consists of a fluorocarbon, in partIcular of polytetrafluoroethylene (PTFE).

According to a further refinement, the supporting surface is metallic, and the spring is connected to the supporting surface by a weld.

According to a further refinement, the spring consists of an elastic metal.

According to a first refinement, the membrane is a measuring membrane of a ceramic pressure-measuring cell, which measuring membrane is arranged in the housing. The process connection has, upstream of the measuring membrane, an annular recess which is bounded by a cylindrical circumferential surface and a radially inwardly extending shoulder surface adjacent thereto on its side facing away from the membrane, and the shoulder surface forms the supporting surface. The seal has a triangular cross section, and a first circumferential surface of the seal rests on an outer, pressure-insensitive edge of the measuring membrane, a second circumferential surface of the seal rests on the cylindrical circumferential surface, and a third circumferential surface of the seal bears in a planar manner against she second leg surface of the spring.

According to a second refinement, the membrane is a metallic separating membrane of a pressure-transmitting means arranged in the housing. The process connection has, upstream of the separating membrane, an annular recess which is bounded by a cylindrical circumferential surface and a radially inwardly extending shoulder surface adjacent thereto on its side facing away from the membrane, and the shoulder surface forms the supporting surface. The seal has a triangular cross section, and a first circumferential surface of the seal rests on an outer, pressure-insensitive edge of the measuring membrane, a second circumferential surface of the seal rests on the cylindrical circumferential surface, and a third circumferential surface of the seal bears in a planar manner against the second leg surface of the spring.

According to a third refinement, the membrane is a metallic separating membrane of a pressure-transmitting means arranged in the housing. The housing has, upstream of the separating membrane, a recess which is surrounded by a cylindrical circumferential surface. The process connection is arranged upstream of the cylindrical circumferential surface and has a radially inwardly extending shoulder surface which is adjacent to a side of the cylindrical circumferential surface which faces away from the membrane, and an outer, pressure-insensitive annular surface of the separating membrane forms the supporting surface. The seal has a triangular cross section, and a first circumferential surface of the seal rests on the shoulder surface, a second circumferential surface of the seal rests against the cylindrical circumferential surface, and a third circumferential surface of the seal bears in a planar manner against the second leg surface of the spring.

One advantage of the pressure sensor according to the invention is that a special form of the spring enables even materials which are free-flowing under certain circumstances because of pressure and/or temperature to be used for the seal. This is not only possible in conjunction with metallic membranes, but equally also in the case of ceramic membranes without other forms of spring and/or seal having to be used.

A further advantage resides in the fact that the seal is optimally positioned. It lies directly in front of gaps which are present and is pressed in the direction of the gaps by the spring action of the spring. A great pressure acting on the spring because of a medium whose pressure is to be measured reinforces the spring action in this direction. It is therefore not possible for the seal to become disengaged, because of a pressure-induced deformation of the seal, even when high pressures are exerting an effect.

The invention and further advantages will now be explained in greater detail with reference to the figures of the drawing in which two exemplary embodiments are illustrated.

DESCRIPTION OF THE PREFERRED EMBODIMENTS

Figure 1:
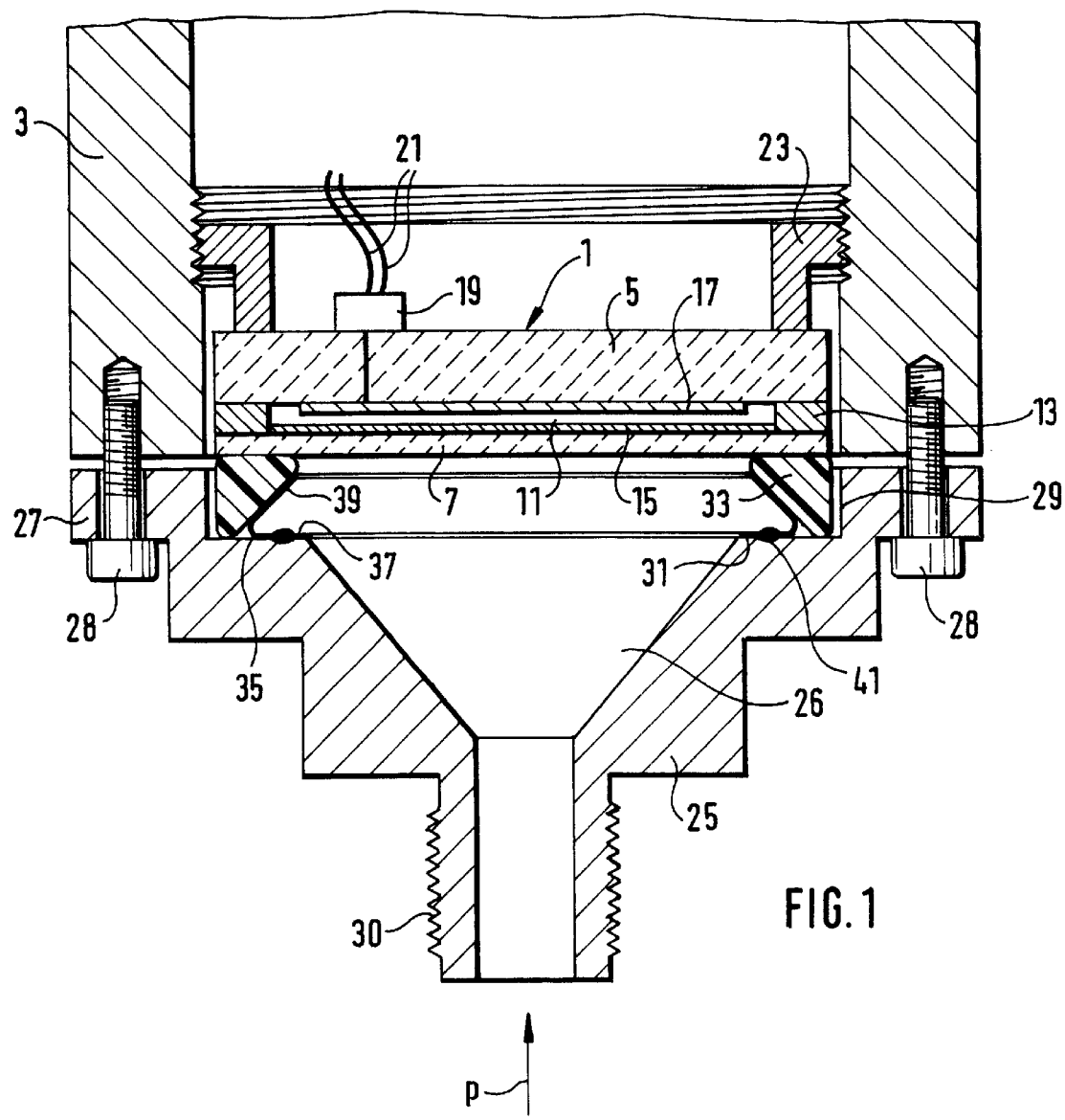
FIG. 1 shows a section through a pressure sensor according to the invention having a ceramic membrane.

FIG. 1 shows a section through a pressure sensor having a ceramic pressure-measuring cell 1. The pressure sensor has a housing 3 which is cylindrical in the exemplary embodiment illustrated. The ceramic pressure-measuring cell 1 is inserted into the housing 3 in such a manner that it essentially ends flush with the front of the housing 3.

The pressure-measuring cell 1 has a basic body 5 and a membrane 7. The basic body 1 and the membrane 7 consist of ceramic. The membrane 7 and the basic body 5 are connected to each other in a pressure-tight and gas-tight manner by means of a joint 13 at their edge with a measuring chamber 11 being formed. The membrane 7 is pressure-sensitive, i.e., a pressure p acting on it causes a deflection of the membrane 7 from its rest position.

The pressure measuring cell 1 has a transducer for converting the pressure-dependent deflection of the membrane 7 into an electric measured variable.

In the exemplary embodiment which is illustrative of a capacitive pressure-measuring cell 1, the transducer comprises an electrode 15 arranged on an inner side of the membrane 7 and at least one counter electrode 17 arranged on an opposite outer side of the basic body 5, which side faces the measuring membrane. Electrical contact is made with the counter electrode 17 of the basic body 5 right to the outer side thereof, and leads to an electronic circuit 19 arranged on the basic body 5.

The electrode 15 and counter electrode 17 form a capacitor, and the electronic circuit 19 converts an electric measured variable, here the capacitance changes of the capacitor, into an electric measuring signal, for example into a correspondingly changing, electric voltage. The measured variable is accessible via connecting lines 21. It may, for example, be fed to a further, electronic unit for further processing and/or evaluation.

During operation, a pressure p which is to be measured acts on an outer side of the membrane 7. This is illustrated symbolically in FIG. 1 by an arrow. The pressure p causes a pressure-dependent deflection of the membrane 7, which deflection is converted by the transducer into the electric measured variable.

Instead of the capacitive transducer which is described, other types of transducer may also be used. Examples of these, which are arranged on the measuring membrane, are wire strain gages, connected together to form a Wheatstone bridge, or piezoresistive elements.

The membrane 7 ends flush with the front of the housing 3 and, on a side of the basic body 5 which faces away from the membrane, a threaded ring 23 is screwed into the housing 3 and rests with an end surface on an outer annular surface of the basic body 5.

The housing 3 is connected to a process connection 25 which serves to feed the medium whose pressure p is to be measured to the membrane 7 which is arranged in the housing 3. The membrane 7 then, in operation, undergoes a deflection which depends on the pressure p which is to be measured.

The process connection 25 is essentially cylindrical and virtually constitutes an extension of the housing 3. it has an axial, continuous hole 26 whose internal diameter increases in the direct facing the housing, so that upstream of the membrane 7 there is a chamber which is filled during operation with the medium whose pressure p is to be measured.

The process connection 25 has, on its side facing the housing, a radially outwardly extending shoulder 27 which rests with an end surface on an identically shaped end surface of the housing 3. In the exemplary embodiment illustrated, the housing 3 and process connection 25 are two components whIch are connected to each other by means of bolts 28 screwed through the shoulder 27 into the housing 3. However, the housing 3 and process connection 25 may also be of one-piece design.

At an end facing away from the housing, the process connection 25 has a cylindrical end section on which an external thread 30 is integrally formed. The external thread 30 serves to faster, the pressure sensor at a measuring place. Of course, instead of the external thread 30 other fastening devices, for example flanges, may be provided.

In the exemplary embodiment illustrated in FIG. 1, the membrane 7 is a measuring membrane of a ceramic pressure-measuring cell 1, and the process connection 25 has, upstream of the membrane 7, an annular recess which is bounded by a cylindrical circumferential surface 29 and a radially inwardly extending shoulder surface 31 adjacent thereto on the side facing away from the membrane.

Provided in the recess is a seal 33 which seals a gap found between the housing 3 and the process connection 25 and/or the membrane 7. In the exemplary embodiment illustrated in FIG. 1, the housing 3 and process connection 25 are two separate components. Therefore it is the gap between the housing 3 and it is the process connection 25 and the gap between the housing 3 and membrane 7 and the ceramic pressure-measuring cell 1 that have to be sealed here. When the housing 3 and process connection 25 are designed in one piece, there is no gap between the housing 3 and process connection 25. The seal 33 then serves to seal the gap between the housing 3 and the membrane 7 of the ceramic pressure-measuring cell 1.

In both cases, the seal 33 bears directly against the gaps and covers them. The seal 33 is clamped between an outer, pressure-insensitive edge of the membrane 7 and the shoulder surface 31 of the process connection 25.

The seal 33 preferably consists of a chemically highly resistant material, for example of a fluorocarbon, in particular polytetrafluoroethylene (PTFE). Since these materials are generally free-flowing as a function of the pressures and/or temperatures acting on them, a spring 35 is provided which keeps the seal 33 in shape.

The spring 35 is two-legged in cross section. The two legs meet each other at an acute angle. The spring 35 therefore has a v-shaped profile. It rests with a first leg surface 37 of the first leg, which leg surface faces away from the second leg, on a supporting surface and is connected fixedly to the latter. In the exemplary embodiment illustrated in FIG. 1, the shoulder surface 31 of the process connection 25 forms the supporting surface. The supporting surface is metallic, and the spring 35 is connected to the supporting surface by a weld 41.

A second leg surface 39 of the second leg of the spring 35, which leg surface faces away from the first leg, bears in a planar manner against the seal 33 and exerts a spring force on the seal 33, which spring force acts in the direction of the gap.

The seal 33 is annular and has a triangular cross section. A first circumferential surface of the seal 33 bears against an outer, pressure-insensitive edge of the membrane 7. A second circumferential surface of the seal 33 rests against the cylindrical circumferential surface 29 of the process connection 25, and a third circumferential surface of the seal 33 bears in a planar manner against the second leg surface 39 of the spring.

The spring 35 consists of an elastic metal, for example stainless steel. If the need arises, it may be coated, for example with a highly resistant alloy, or may consist in its entirety of a high-quality material, for example Hastelloy.

Figure 2:
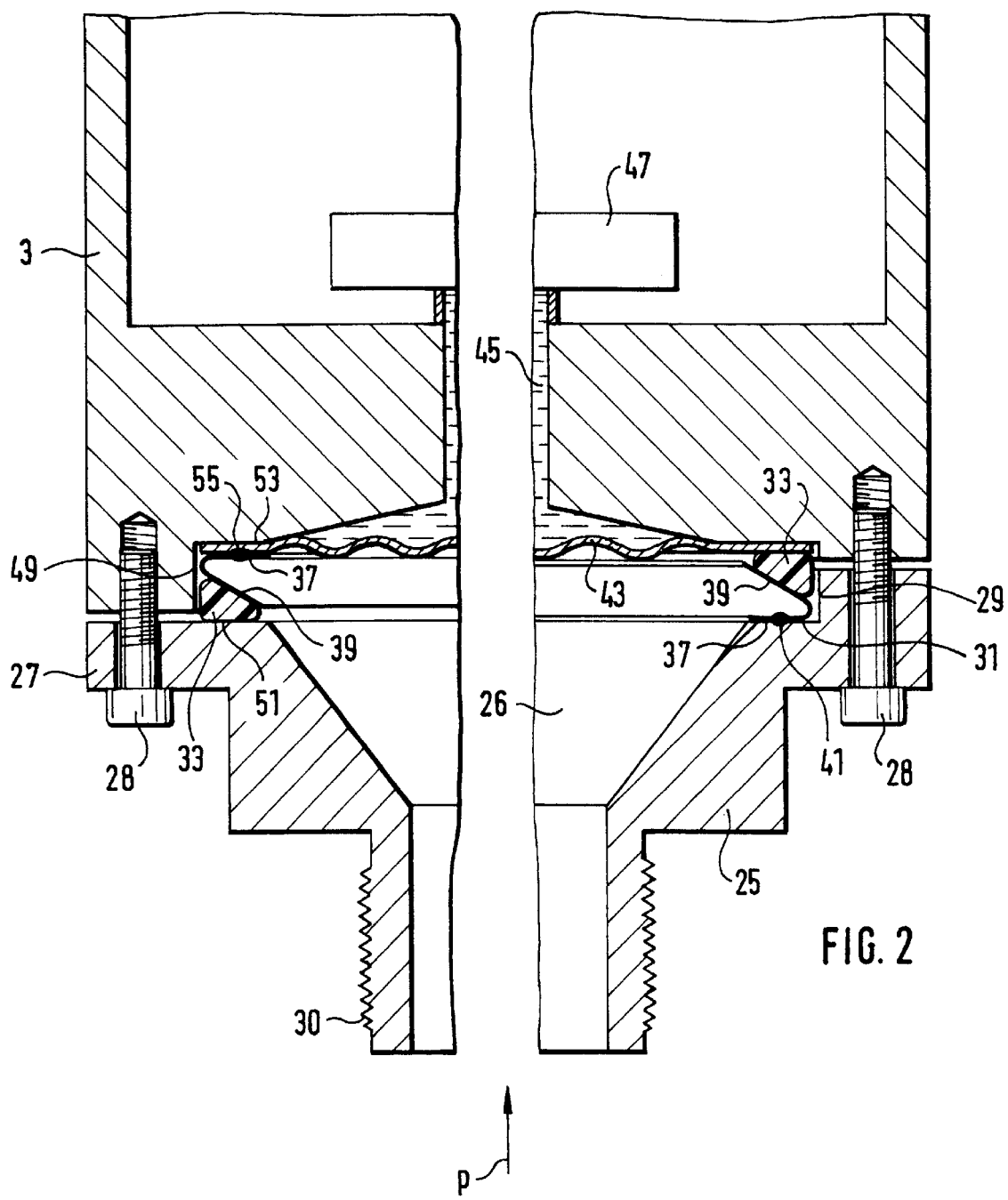
FIG. 2 shows a section through a preasure sensor according to the invention having a metallic membrane.

FIG. 2 shows a further exemplary embodiment of a pressure sensor according to the invention. Since it largely coincides with the exemplary embodiment illustrated in FIG. 1, only the differences on the exemplary embodiment illustrated in FIG. 1 are explained in greater detail below.

The essential difference resides in the fact that in the case of the exemplary embodiment illustrated in FIG. 2, rather than a ceramic pressure-measuring cell which is mounted in the housing 3 being provided, the housing 3 has an opening which is closed by a membrane 43. The membrane 43 is a metallic separating membrane of a pressure-transmitting means arranged in the housing 3. The membrane 43 is welded onto the housing 3, for example at an outer, pressure-insensitive edge. The pressure-transmitting means has a chamber which is adjacent to that side of the membrane 43 which faces away from the process connection and is filled with a pressure-transmitting liquid, for example a silicon oil, and is connected to a pressure-measuring cell 47 via a pressure line 45 which is likewise filled with liquid. A pressure p which acts or the membrane 43 causes a deflection of the membrane 43 and is transmitted to the pressure-measuring cell 47 by the pressure-transmitting liquid. The pressure-measuring cell 47 senses the pressure acting on it and converts it into an electric measured variable which is available for further processing and/or evaluation.

Since the membrane 43 is metallic, the seal 33 and the spring 35 may be arranged in two different ways.

In the right-hand half of FIG. 2, an arrangement is illustrated which corresponds to the arrangement illustrated in FIG. 1 in conjunction with the ceramic membrane 7. The membrane 43 is welded to the housing 3 flush with is front and the process connection 25 has, upstream of the metallic separating membrane, an annular recess which is bounded by a cylindrical circumferential surface 29 and a radially inwardly extending shoulder surface 31 which is adjacent thereto on its side facing away from the membrane. The shoulder surface 31 forms the supporting surface for the spring 35. In this case too the seal 33 has a triangular cross section and rests with a first circumferential surface against an outer, pressure-insensitive edge of the membrane 43. The second circumferential surface of the seal 33 rests against the cylindrical circumferential surface 29, and the third circumferential surface of the seal bears in a planar manner against the second leg surface 39 of the spring 35.

In the exemplary embodiment illustrated in the left-hand half of FIG. 2, the membrane 43 is not flush with the front, but rather is set back somewhat with respect to a front of the housing. The housing 3 has, upstream of the metallic separating membrane, a recess which is surrounded by a cylindrical circumferential surface 49. The process connection 25 is arranged upstream of the cylindrical surface 49 and has a radially inwardly extending shoulder surface 51 adjacent to a side of the cylindrical circumferential surface 49 which faces away from the membrane.

An outer, pressure-insensitive annular surface 53 of the separating membrane forms the supporting surface on which a leg of the spring 35 rests. The spring 35 is connected to the supporting surface, for example by a weld 55.

Here too the seal 33 has a triangular cross section. It rests with a first circumferential surface on the shoulder surface 51. A second circumferential surface of the seal 33 rests on the cylindrical circumferential surface 49, and a third circumferential surface of the seal bears in a planar manner against the second leg surface of the spring 35.

The spring 35 is identical to the spring 35 illustrated in FIG. 1. It is just fitted the other way around, with the result that also in the exemplary embodiment illustrated in FIG. 2, the first leg rests on the supporting surface and the second leg rests with its leg surface 39, which faces away from the first leg, in a planar manner on the seal 33.

What is claimed is:

1. A pressure sensor, having:
   a housing;
   a membrane mounted in said housing;
   a process connection which is connected to said housing and serves to feed to the sensor a medium whose pressure (p) is to be measured by said membrane, said membrane, in operation, undergoing a deflection which depends on the pressure (p) which is to be measured;
   a gap formed between said housing, said process connection and/or said membrane;
   a seal which bears directly against said gap, covers said gap, and seals said gap, said seal being clamped between said membrane, said process connection and/ or said housing; and
   a spring which is two-legged in cross section, whose first and second legs enclose an acute angle, whose first leg has a leg surface which faces away from the second leg, rests on a supporting surface defined by said process connection, and is connected fixedly to the latter, and whose second leg has a leg surface which faces away from said first leg, bears in a planar manner against said seal and exerts a spring force on said seal, which spring force acts in the direction of said gap.

2. The pressure sensor as claimed in claim 1, in which said seal consists of a fluorocarbon, in particular of polytetrafluoroethylene (PTFE).

3. The pressure sensor as claimed in claim 1, in which said supporting surface is metallic and said spring is connected to said supporting surface by a weld.

4. The pressure sensor as claimed in claim 1, in which said spring consists of an elastic metal.

5. The pressure sensor as claimed in claim 1, wherein:
   said membrane is a measuring membrane of a ceramic pressure-measuring cell, which measuring membrane is arranged in said housing,
   said process connection has, upstream of said measuring membrane, an annular recess which is bounded by a cylindrical circumferential surface and a radially inwardly extending shoulder surface adjacent thereto on its side facing away from said membrane,
   said shoulder surface forming said supporting surface,
   said seal has a triangular cross section,
   a first circumferential surface of said seal rests against an outer, pressure-insensitive edge of said measuring membrane,
   a second circumferential surface of said seal rests against said cylindrical circumferential surface, and
   a third circumferential surface of said seal bears in a planar manner against said second leg surface of said spring.

6. The pressure sensor as claimed in claim 1, wherein:
   said membrane is a metallic separating membrane of a pressure-transmitting means arranged in said housing,
   said process connection has, upstream of said separating membrane, an annular recess which is bounded by a cylindrical circumferential surface and a radially inwardly extending shoulder surface adjacent thereto on its side facing away from said membrane,
   said shoulder surface forming said supporting surface,
   said seal has a triangular cross section,
   a first circumferential surface of said seal rests against an outer, pressure-insensitive edge of said separating membrane, a second circumferential surface of said seal rests against said cylindrical circumferential surface, and a third circumferential surface of said seal bears in a planar manner against said second leg surface of said spring.

7. The pressure sensor as claimed in claim 1, wherein:
   said membrane is a metallic separating membrane of a pressure-transmitting means arranged in said housing,
   said housing has, upstream of said separating membrane, a recess which is surrounded by a cylindrical circumferential surface,
   said process connection is arranged upstream of said cylindrical circumferential surface and has a radially inwardly extending shoulder surface adjacent to a side of said cylindrical circumferential surface which faces away from said membrane, an outer, pressure-insensitive annular surface of said separating membrane forming said supporting surface,
   said seal has a triangular cross section,
   a first circumferential surface of said seal rests on said shoulder surface, a second circumferential surface of said seal rests against said cylindrical circumferential surface, and a third circumferential surface of said seal bears in a planar manner against said second leg surface of said spring.

* * * * *